United States Patent [19]

Mafune et al.

[11] 4,051,325

[45] Sept. 27, 1977

[54] SPEECH INTERCOMMUNICATION SYSTEM

[75] Inventors: Yasuo Mafune; Juhei Takahashi, both of Yokohama, Japan

[73] Assignee: Matsushita Electric Industrial Co., Ltd., Osaka, Japan

[21] Appl. No.: 652,847

[22] Filed: Jan. 27, 1976

[30] Foreign Application Priority Data

Jan. 31, 1975 Japan ................................. 50-13888
July 8, 1975 Japan ................................. 50-84244
Nov. 14, 1975 Japan ................................. 50-137437

[51] Int. Cl.² ............................................. H04M 9/10
[52] U.S. Cl. .................................................. 179/1 HF
[58] Field of Search ................. 179/81 B, 1 HF, 1 H, 179/1 VC

[56] References Cited

U.S. PATENT DOCUMENTS

| | | | |
|---|---|---|---|
| 3,027,429 | 3/1962 | Eklov | 179/1 HF |
| 3,751,602 | 8/1973 | Breeden | 179/1 HF |
| 3,823,273 | 7/1974 | Beeman et al. | 179/81 B |
| 3,845,244 | 10/1974 | Yonezu | 179/1 VC |
| 3,970,786 | 7/1976 | Randmere | 179/1 HF |
| Re. 28,919 | 7/1976 | Berkley et al. | 179/1 HF |

FOREIGN PATENT DOCUMENTS

| | | | |
|---|---|---|---|
| 2,448,412 | 4/1975 | Germany | 179/81 B |
| 1,957,883 | 7/1971 | Germany | 179/1 VC |

*Primary Examiner*—George G. Stellar
*Attorney, Agent, or Firm*—Stevens, Davis, Miller & Mosher

[57] ABSTRACT

In an intercommunication system comprising transmit and receive channels including respective variolossers and being connectable through a hybrid transformer to an external line, the variolossers being so constructed as to allow a high frequency region of the voice frequency band to pass therethrough even when they express a large amount of loss, an AGC amplifier and a manually gain-controllable amplifier being provided in the receive channel, and the control input of the variolossers being picked up from different parts of the receive channel respectively in the transmit mode and the receive mode.

4 Claims, 14 Drawing Figures

SPEECH INTERCOMMUNICATION SYSTEM

This invention relates to speech intercommunication systems using interphones, telephone sets or the like and, more particularly, to sytems which permit hands-free loudspeaking communication.

The prior art speech intercommunication systems for hands-free loudspeaking intercommunication present the problem of "singing" due to formation of a loop including an acoustic coupling path from loudspeaker to microphone, so that a sufficient sound level cannot be obtained.

In order to solve this problem, it has been proposed that a variolosser (variable-loss circuit) be inserted in each of the transmitting and receiving branches and that these circuits be reciprocally controlled by detecting which branch a speech signal (aural signal) is carried by. This is done in such a manner as to make the loss amount in the branch carrying the speech signal low and the loss amount in the other branch high in order to keep low the gain of the loop to heighten transmitted speech without causing "singing". This system is called a voice-switching system.

The merit of this voice-switching is that the sound level of the incoming speech can be increased by increasing the loss amount of the variolosser inserted in each branch. On the demerit side, however, the presence of the variolossers dictates provision of means for producing a control signal for driving these circuits and also properly setting time constants and other parameters of circuits related to the setting of switching timing, and unless these demands are fully met a delay time will be involved before switching from transmit mode to receive mode or vice versa to give rise to first-syllable clipping and failure of "break in", thus degradating the quality of the transmitted speech.

The above aspects as well as the invention will now be described in conjunction with the accompanying drawings, in which.

Figure 1:
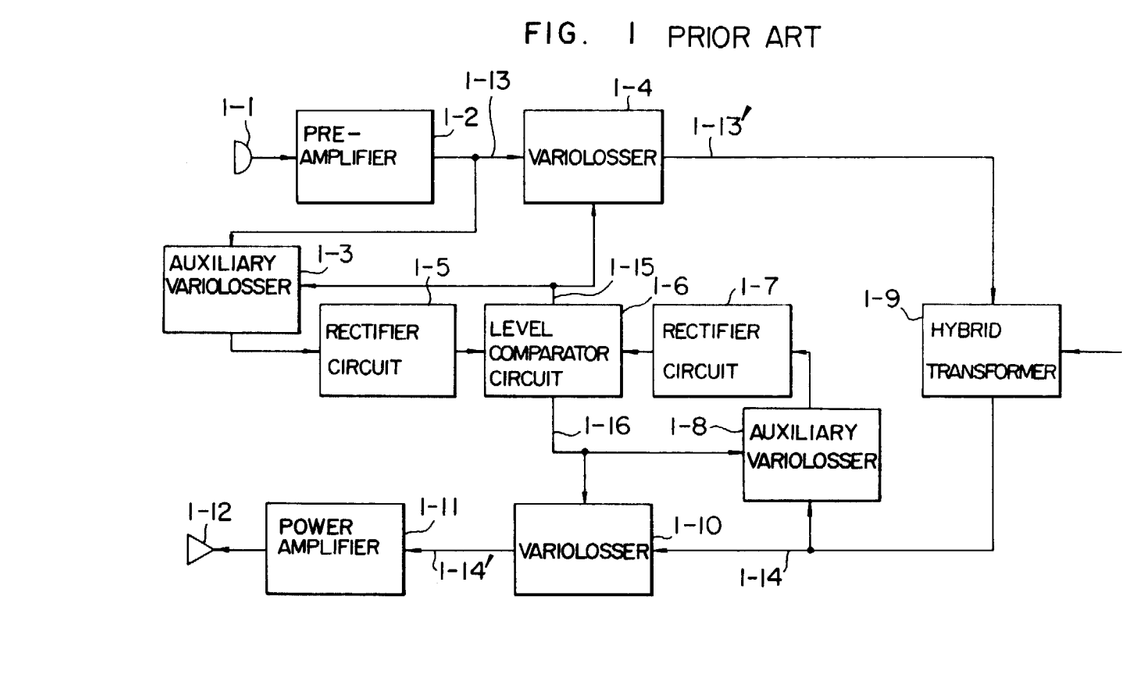
FIG. 1 is a block diagram showing a prior art intercommunication system.

While there have heretofore been devised various communication systems making use of voice-switching, they all have a basic function as outlined in the block diagram of FIG. 1.

A microphone 1-1's input is amplified by a preamplifier 1-2, the output of which is coupled through a transmit branch 1-13 to a variolosser 1-4 and is also supplied to an auxiliary variolosser 1-3 (which is also termed an input nullifying circuit).

The signal coupled through the auxiliary variolosser 1-3 is led to a rectifier circuit 1-5 for rectification into a d-c signal which is led to a level comparator circuit 1-6.

The level comparator circuit 1-6 compares the aforementioned d-c signal and other d-c signal which is produced when an incoming signal appearing on a receiving branch 1-14 is coupled through an auxiliary variolosser 1-8 to a rectifier circuit 1-7. If the transmit signal compared is higher in level, it is coupled through a control signal line 1-15 to make the losses in the variolosser 1-4 and the auxiliary variolosser 1-3 low and is also coupled through a control signal line 1-16 to make the losses in a variolosser 1-10 and auxiliary variolosser 1-8 high. The mode thus established is the so-called transmit mode, in which the input to the microphone 1-1 is coupled with low loss to a hybrid transformer 1-9 to be sent forth to the external line while the incoming signal coupled through the external line to the hybrid transformer 1-9 is subjected to high loss in the variolosser 1-10 for reducing or nullifying the level of the speech issuing from a loudspeaker 1-12.

If the output of the rectifier circuit 1-7 is higher in level than the output of the rectifier circuit 1-5, the variolosser 1-4 and auxiliary variolosser 1-3 are rendered into the high loss mode while rendering the variolosser 1-10 and auxiliary variolosser 1-8 into the low loss mode thus giving attenuation to the transmitting branch while permitting the incoming signal to be amplified by a power amplifier 1-11 and issued as speech at a high level. This mode is the so-called receive mode.

The auxiliary variolossers 1-3 and 1-8 here are incorporated because they are needed for steadily maintaining the mode once set up, either transmit or receive mode.

In order to be able to switch the transmit mode once established over to the receive mode, it is necessary to meet the condition $$V_R > V_S + L_{AR}, \tag{1}$$

where $V_S$ is the voltage in decibels on the transmitting branch 1-13, $V_R$ is the voltage in decibels on the receiving branch, and $L_{AR}$ is the loss in decibels given by the auxiliary variolosser 1-8.

On the other hand, for switching the receive mode once set up over to the transmit mode it is required to satisfy the condition $$V_S > V_R + L_{AS} \tag{2}$$

where $L_{AS}$ is the loss in decibels given by the auxiliary variolosser 1-3.

Meanwhile, in order for the receive mode once set up to be steadily maintained without being misswitched due to a voltage $V_{SF}$ produced on the transmitting branch 1-13 as a result of acoustic coupling of speech radiated from the loudspeaker 1-12 back to the nearby microphone 1-1, it is required to satisfy the condition $$L_{AS} > a_{(dB)} \tag{3}$$

where α is the acoustic coupling gain in decibels of the path from the receiving branch 1-14 through the varioloser 1-10, power amplifier 1-11, loudspeaker 1-12, microphone 1-1 and preamplifier 1-2 to the transmitting branch 1-13.

The gain α here varies with frequency and ranges from about 15 to 30 decibels for the low freqency region where speech (aural signal) energy components are crowded. Therefore, it will be seen from the relations (1)and (2) that "break in" is very difficult in this case because a high signal level about 15 to 30 decibels higher than the incoming signal level is required for the switching of modes.

In addition, the leading portion of a majority of speech begins with a consonant whose level is low and usually insufficient to meet the afore-mentioned conditions, so that first-syllable clipping is likely to result.

Further, because of the above drawback spontaneous unnecessary switching of modes is likely to be caused by a low level portion or pause portion of either the transmitted or incoming speech, and to prevent this it is necessary to set a long discharge time constant for the rectifier circuits 1-5 and 1-7 or provide the level comparator circuit with a hysteresis characteristic. To do so, however, would promote the difficulty of "breaking in" to the incoming speech and the possibility of first-syllable clipping of the transmitting branch speech sent forth immediately after the end of the incoming speech.

In the prior art system, therefore, switching to the transmit mode by "breaking in" to the incoming speech cannot be effected unless a rather loud voice is used when speaking into the microphone, so that it is difficult to transmit a short response or interjection of an agreement to the incoming speech information, for example. Also, unless the transmitted speech is begun after a pause following the end of the incoming speech, a long first-syllable clipping would result thereby marring the transmission of correct information.

These drawbacks completely negate the function of simultaneous speech communication in the simultaneous bilateral communication system and go counter to the concept of face-to-face communication in loud-speaking telephony.

The features of the invention, accordingly, reside in:

A. that a peculiar characteristic related to the afore-mentioned characteristic of the acoustic coupling gain α is given to variolossers while also providing unique means for producing a control signal for controlling these circuits, thereby improving the difficulty of "break in" and possibility of first-syllable clipping;

B. that freedom from mis-switching and smooth switching of the transmit and receive modes are ensured;

C. that "break in" can be readily done; and

D. that the construction is simplified.

Regarding feature (A) of the invention, the characteristic given to the variolossers is determined, in principle, such that the loss amount set for the variolossers in the transmit or receive mode thereof is made small over a frequency range over which "singing" will not result even if these variolossers are rendered into the high loss mode, that is, the frequency range over which the loop gain in the case when the transmitting and receiving branches are directly connected without insertion of the variolossers is less than unity, whereby first-syllable clipping will be made unrecognizable.

The principles underlying the means for producing the control signal for controlling the mode of the system make use of the face that speech signals coupled to the power amplifier and the feed-back signal output produced from the preamplifier as a result of acoustic coupling from the loudspeaker to the microphone are closely related to each other. By taking the difference between the envelopes of both signals the output of the preamplifier is distinguished as to whether it is the feed-back signal or is produced by the speech of a person near the microphone, and the variolossers are set to either the transmit mode or the receive mode depending upon the result of distinguishment.

With this arrangement, it is possible to dispense with the auxiliary variolossers which present serious problems in connection with the "break in" and first-syllable clipping as mentioned earlier, thus permitting very smooth intercommunication.

Thus, according to the invention there is provided a speech intercommunication system, which comprises transmit and receive region systems adapted to function independently and individually including respective variolosser means adapted to be switched between high and low loss modes, means to detect signals present in the transmit region and receive region systems, and means to logarithmically convert the detected signals through logarithmic a-c compression, detect envelopes of the converted signals and produce a control signal for controlling the variolosser means from the difference between the detected envelopes. The invention will now be described in conjunction with some preferred embodiments thereof.

Figure 2:
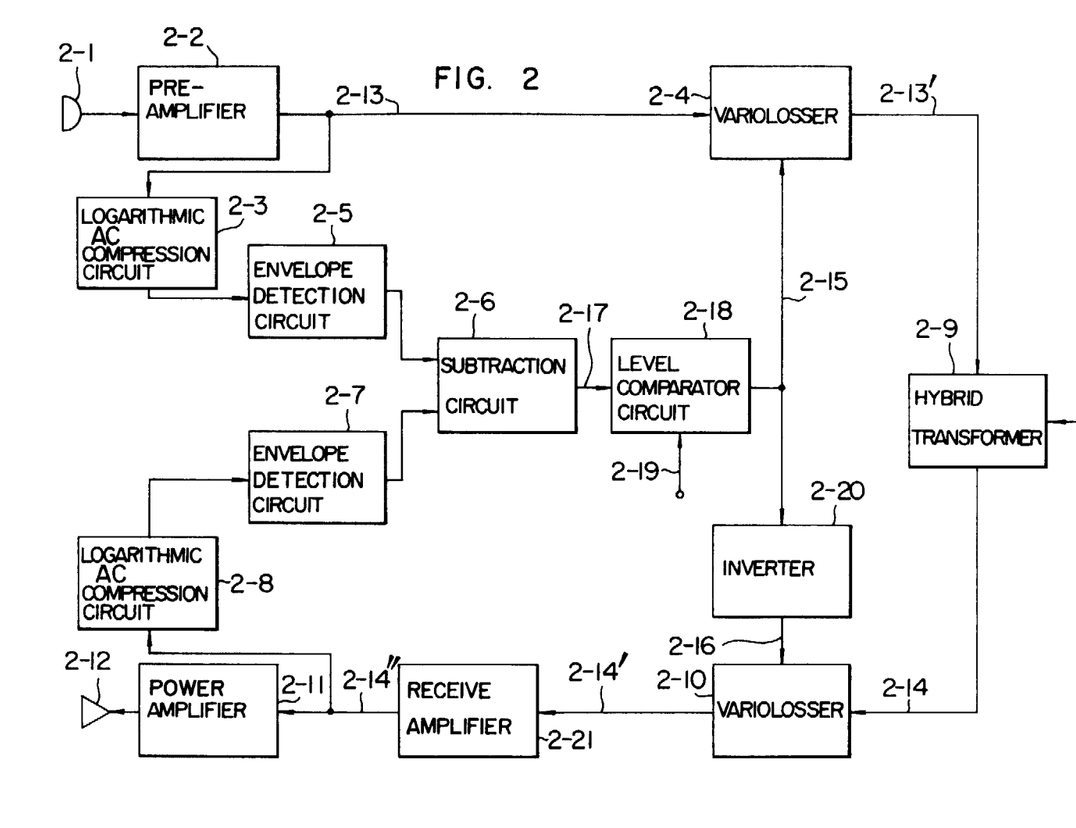
FIG. 2 is a block diagram showing an embodiment of the intercommunication system according to the invention.

The block diagram of FIG. 2 shows an embodiment of the invention. Designated at 2-1 is a microphone, at 2-2 a preamplifier, at 2-3 and 2-8 logarithmic a-c compression circuits, at 2-5 and 2-7 envelope detection circuits, at 2-6 a subtraction circuit, at 2-18 a comparator circit, at 2-20 an inverter, at 2-4 and 2-10 variolossers, at 2-9 a hydrid transformer, at 2-11 a power amplifier, at 2-12 a loudspeaker, at 2-13 and 2-13' a transmitting branch, and at 2-14 and 2-14' a receiving branch.

Figure 3A:
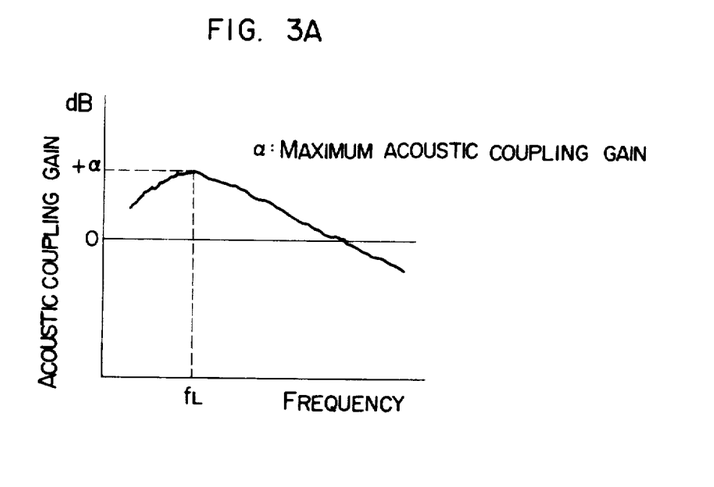
FIGS. 3A and 3B show characteristics involved in part of the same embodiment.
Figure 3B:
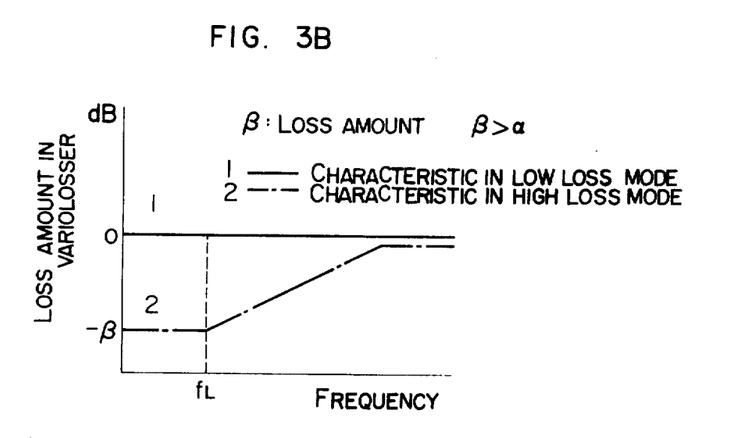

FIGS. 3A and 3B show the frequency characteristic of the output produced from the preamplifier 2-2 in FIG. 2 due to acoustic coupling when a constant a-c voltage is supplied as an input to the power amplifier 2-11, that is, the transmission frequency characteristic of the acoustic coupling gain α, and a loss characteristic (or loss amount β) to be given to the variolossers 2-4 and 2-10.

The characteristic to be given to the variolossers 2-4 and 2-10 will now be considered in detail. In order to obtain steady and high-level sound output without causing the afore-mentioned "singing", it is necessary to hold the gain of the whole transmission loop inclusive of the acoustic coupling path at less than unity, and this means that the greater the output of the loudspeaker 2-12 the greater the variation range of loss in the variolossers 2-4 and 2-10 (the ratio between the loss in the conduction mode and that in the cut-off mode) is required.

However, since the control signal coupled to the variolossers is produced from the speech signal present in the transmitting branch 2-13 or receiving branch 2-14, a delay is naturally involved between these signals and causes first-syllable clipping.

In addition, the leading portion or so-called first syllable of a majority of speech begins with a consonant, which is low in level, usually lower than the fixed level required to alter the mode of communication thus extending the delay period. Where the loss range of the variolossers is wide, therefore, complete deletion of the head portion of speeche, i.e., first-syllable clipping causes deterioration of the speech quality. This drawback has been inherent in the prior art systems, and the function of loudspeaking speech intercommunication has been met with sacrifice in the speech quality.

The invention solves this problem, and it is based on the fact that where the loudspeaker 2-12 and microphone 2-1 are installed within the same small casing the transmission characteristic of the acoustic coupling gain $\alpha$ of the path from the power amplifier 2-11 through the loudspeaker 2-12 and microphone 2-1 to the output of the preamplifier 2-2 is in most cases as shown in FIG. 3A. According to the invention, a characteristic as shown by the one-dot chain line in FIG. 3B, which is opposite or reverse to the characteristic in FIG. 3A, is given to the variolossers 2-4 and 2-10 in the case where the loss amount therein is large, thus permitting high-level sound to be issued without causing "singing" and appreciable first-syllable clipping.

With this characteristic given to the variolossers 2-4 and 2-10 the transmission loop gain can be held at a uniform value less than unity irrespective of frequency so that "singing" can be eliminated. Also, since the high frequency region of the speech frequency band is always transmitted irrespective of whether the system is in the transmit mode or receive mode, that is, irrespective of whether the variolosser 2-4 or 2-10 is in the high loss mode, even when the action of switching of the states is delayed, for instance in the case when the speech head begins with a low level consonant portion (which mostly consists of high frequency components), the first-syllable clipping is not felt.

Further, in the case when the system is not completely switched such as when simultaneous inputs are coupled to the respective variolossers or when giving a short response or interjection of an agreement to an incoming speech information during each mode, the function of simultaneous bilateral communication can be obtained although with a slight decrease in sound level and quality, which is very useful.

The fact that the provision of the loss characteristic substantially opposite to the acoustic coupling gain $\alpha$ to the variolosser in the high loss mode is very effective for the elimination of first-syllable clipping and for providing the function of simultaneous bilateral communication, as has been described so far, will be clearly understood independently of the manner of producing a control signal for controlling the variolossers to be described hereinafter; it will be apparent when it is applied, for instance, to the prior art control system described earlier in connection with FIG. 1.

Figure 4:
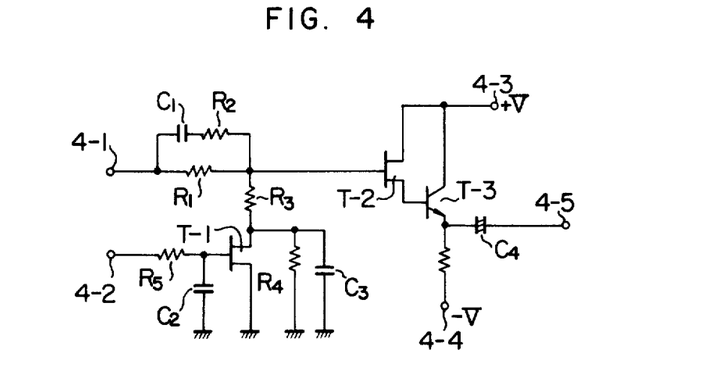
FIG. 4 is a circuit diagram showing an example of the variolosser.

FIG. 4 shows an example of the variolosser. Designated at 4-1 in the Figure is a speech signal input terminal, at 4-2 a control signal input terminal connected to the branch 2-15 or 2-16 in FIG. 2, at 4-3 and 4-4 power supply terminals, and at 4-5 a speech signal output terminal.

An impedance $Z_1$ constituted by a capacitor $C_1$ and resistors $R_1$ and $R_2$ and an impedance $Z_2$ constituted by resistors $R_3$ and $R_4$, the internal resistance of an FET T-1 and a capacitor $C_3$ form a voltage divider, through which a speech signal appearing at the speech signal input terminal 4-1 is coupled through an FET T-2 and a subsequent stage emitter follower circuit.

An impedance constituted by the resistor $R_4$ and capacitor $C_3$ is set to a sufficiently high value compared to the impedance $Z_1$ at the upper limit frequency of the requisite speech signal transmission band (about 5,000 Hz).

With this arrangement, when a negative voltage prevails at the control signal input terminal 4-2 the source-drain path of the FET T-1 is "off" so that the impedance thereof is high. In this mode, a condition $Z_2 \gg Z_1$ is met from the aforementioned conditions, so that the speech signal appearing at the speech signal input terminal 4-1 is coupled without substantial low to the FET T-2 and appears at the speech signal output terminal 4-5.

When a voltage nearly equal to 0 volt is applied to the control signal input terminal 4-2, the source-drain path of the FET T-1 is rendered into the conduction state, thus apparently shunting the resistor $R_4$ and capacitor $C_3$. Consequently, a signal supplied to the speech signal input terminal 4-1 is voltage divided to $R_3/(Z_1 + R_3)$ times its input level before it is coupled to the FET T-2 and appears from the speech signal output terminal 4-5.

Since $Z_1$ is constituted by the resistors $R_1$ and $R_2$ and capacitor $C_1$, the voltage ratio in the voltage divider is substantially $R_3/(R_1 + R_3)$ at low frequencies at which the impedance of the capacitor $C_1$ is high and $R_3/(R_2 + R_3)$, provided $R_1 \gg R_3$, at high frequencies at which the impedance of the capacitor $C_1$ is low.

By appropriately selecting the resistances of the resistors $R_1$, $R_2$ and $R_3$ and the capacitance of the capacitor $C_1$ it is possible to approximate the characteristic as shown in FIG. 3B, and by inserting variolossers having such characteristic each in each of the transmitting and receiving branches for reciprocally opposite control of them a communication system which is less liable to first-syllable clipping and has superior function for simultaneous bilateral communication can be realized.

The circuit construction mentioned above is only illustrative and by no means limitative, that is, the system according to the invention may be realized by using other circuit constructions of the same purpose as well as is never limited by its circuit component elements.

The operation of the circuit of FIG. 2 will now be described. It is assumed that when neither transmitting input nor incoming input is present, the circuit is in the receive mode with the variolosser 2-4 in the high loss mode and the variolosser 2-10 in the low loss mode.

The operation differs depending upon the initial condition, so it will be described for four different initial conditions. The inverter 2-20 is provided for supplying an opposite polarity signal with respect to the variolosser 2-4 to the circuit 2-10.

The four initial conditions are, namely, (1) when an incoming input appears in the receive mode of the circuit, that is, in the absence of a previous transmit or incoming signal, (2) when a transmit signal is coupled in the presence of an incoming signal, (3) when a transmit input appears in the absence of a previous transmit or incoming signal, and (4) an incoming signal is coupled in the presence of a transmit signal.

CONDITION 1

The incoming speech signal coupled through the hybrid transformers 2-9 and appearing on the receiving branch 2-14 is passed without loss through the variolosser 2-10 to a receive amplifier 2-21 for suitable level adjustment before it is coupled to the power amplifier 2-11 and also to the logarithmetic a-c compression circuit 2-8.

The signal coupled to the power amplifier 2-11 is suitably amplified therein for coupling to the loudspeaker 2-12, which produces corresponding sound.

The speech sound radiated from the loudspeaker 2-12 is fed back to the microphone 2-1 located nearby, and the feed-back signal therefrom is amplified through the preamplifier 2-2 and then coupled through the transmitting branch 2-13 to the variolosser 2-4 and logarithmetic a-c compression circuit 2-3.

The incoming signal and feed-back signal entering the respective logarithmetic a-c compression circuits 2-8 and 2-3 are converted therein such that the output levels therefrom are logarithmically related to their input levels. This is done becaust it is effective for obtaining a uniform difference output over wide level variations of the speech signal. The outputs of the logarithmic a-c compression circuits 2-8 and 2-3 are coupled to the respective next-stage envelope detection circuits 2-7 and 2-5. The envelope detection circuits 2-7 and 2-5 detect the envelopes of the respective, logarithmically converted incoming and feed-back signals for coupling to the next-stage subtraction circuit 2-6, in which the difference between its two inputs is obtained.

The difference output thus obtained is coupled to the comparator circuit 2-8 for comparison with a preset threshold value T supplied from a threshold value supply terminal 2-19. In this condition, i.e., condition (1), the incoming input and feed-back input are similar, so that the difference output is small and never surpasses the threshold value T. Thus, mis-switching of the system from the receive mode to the transmit mode due to the speech output from the loudspeaker, or so-called receive blocking, will not take place, and the receive mode can be steadily maintained.

Where the feed-back gain of the path from the input of the power amplifier 2-11 through the loudspeaker 2-12 and microphone 2-1 to the output of the preamplifier 2-2 is $\alpha$ (f) (which usually varies with frequency), by giving the logarithmic a-c compression circuit 2-8 a gain characteristic approximating $\alpha$ (f) with respect to the logarithmic a-c compression circuit 2-3 the outputs of the envelope detection circuits 2-7 and 2-5 may be made the same, inclusive of variations with time, whereby the output of the subtraction circuit may always be made substantially zero to permit the threshold value T to be set to a value very close to zero. However, in order to eliminate mis-switching of mode due to errors involved in the characteristics of the individual element circuits the least bias voltage required to accommodate the above errors is applied as the threshold value T.

Further, for the purpose of simplifying the circuit construction it is possible to use identical logarithmic a-c compression circuits and set the threshold value T to match the acoustic coupling gain $\alpha$ ($f_p$) at the frequency $f_p$ at which the feed-back is maximum.

CONDITION 2

When a transmit signal is coupled in the presence of an incoming signal in the receive mode, the preamplifier 2-2 provides as its output the feed-back signal and transmit region signal superimposed upon each other.

In this case, the waveform of the output of the envelope detection circuit 2-7 produced from the signal present in the receiving branch 2-14" is different from that of the output of the envelope detection circuit 2-4 produced from the output of the preamplifier 2-2, so that the difference output can become large enough to easily exceed the threshold value T within a short period of time. Thus, the receive mode is quickly switched over to the transmit mode. Once the transmit mode sets in, an incoming signal is subjected to attenuation in the variolosser 2-10, thus causing a further increase of the difference output to aid in stabilizing the established transmit mode. Upon disappearance of the transmit signal the receive mode is instantaneously restored in conforming to the assumption and with the function in the case of condition (1).

The switching to the transmit mode by surpassing the incoming signal is a matter of probability regarding the variations of speech signals, and sometimes a slight delay time may be involved before transmit mode sets in, giving rise to the so-called first-syllable clipping. Such first-syllable clipping, however, is not recognized by virtue of the afore-mentioned characteristic given to the variolossers.

CONDITION 3

When there is an input to the microphone 2-1 in the absence of a signal in the receiving branch 2-14, the output signal of the preamplifier 2-2 is coupled through the logarithmic a-c compression circuit 2-3 and envelope detection circuit 2-5 to the subtraction circuit 2-6 as mentioned earlier. In this case, however, the envelope detection circuit 2-7 provides no substantial output, so that the output of the subtraction circuit 2-6 is the same as the output of the envelope detection circuit 2-5 and can easily surpass the threshold value. Thus, the system can be immediately switched from the receive mode to the transmit mode.

CONDITION 4

When an incoming input is coupled to the receiving branch 2-14 in the transmit mode that has been brought about at the time of condition (2) and (3), it is subjected to loss in the variolosser 2-10 and then coupled through the receiving branch 2-14", logarithmic a-c compression circuit 2-8 and envelope detection circuit 2-7 to the subtraction circuit 2-6 for taking the difference with respect to the output of the other envelope detection circuit 2-5. However, the loss amount $\beta$ ($\beta < 2\alpha$) in the variolosser 2-10 tends to be cancelled by virtue of the aforementioned difference of gain given to the envelope detection circuit 2-5 or the threshold value T which is provided for the sake of preference of the receive mode. Thus, in this case the switching to the receive mode is comparatively easily effected.

In this case, like the case of condition (2) a delay time may sometimes be involved before switching from the transmit to the receive mode depending upon the probability-wise variations or distribution of the speech signal level, but first-syllable clipping is not felt by virtue of the characteristic given to the variolossers.

It will be appreciated from the operation described above in connection with the various initial conditions that since the difference signal between envelope signals obtained respectively from the input signal to the power amplifier 2-11 and the output signal from the preamplifier 2-2 is used as a control signal for switching to the receive mode or transmit mode, it is possible to steadily maintain the established transmit or receive mode even where auxiliary variolossers which constitute an important factor in deterioration of speech quality in the prior art communication systems are omitted. Also, the switching of modes can be immediately effected when the envelope difference exceeds a predetermined value. Thus, it is possible to realize a hands-free loudspeaking communication system, which permits very smooth speech intercommunication.

Further, by appropriately compensating for the level reduction of the incoming signal due to loss in the transmitting external line by means of the receive amplifier 2-21, with increase of the signal radiated from the loudspeaker 2-12 the level of the control signal may be made to change similarly so as to maintain a fixed control relation for ensuring the same operation as mentioned above. In this way, it is possible to obtain steady operation which can be easily adjusted.

The control signal inverter circuit 2-20 is provided for reciprocally controlling both variolossers 2-4 and 2-10 by the same control signal.

With the combination of (A) and (B) as mentioned above the first-syllable clipping due to the delay involved at the time of producing the control signal can be improved, while permitting omission of auxiliary variolossers corresponding to 1-3 and 1-8 in FIG. 1 and realization of a system capable of ready "break in", which is very useful in practice.

The above arrangement of the system is basically applied when the transmission loss is low.

If the transmission line is assumed to be the usual telephone line, it is possible that the transmission loss greatly varies, for instance from 0 to above 30 decibels and also that the side tone greatly varies from about −15 to about −30 decibels. Where a transmission loss compensation amplifier is provided, it is inevitable to increase the loss amount in the variolossers so as to avoid singing.

However, if the loss amount $\beta$ in the variolossers is excessively increased (to be $\beta > 2\alpha$), deficiencies with respect to "break in" are likely to arise. In loudspeaking telephony, level comparison has to be essentially made before a large loss is provided by the variolosser, that is, immediately after reception of the incoming input via the hybrid transformer. To this end, acoustic coupling and side tone may be monitored practically independently of each other through level comparison of the speech signals, and the invention is based upon loudspeaking telephony where the level comparison with respect to the acoustic coupling is done for switching from the receive mode to the transmit mode and the level comparison with respect to the side tone is done for switching from the transmit mode to the receive mode.

These principles underlying the invention will now be discussed in conjunction with an embodiment shown in FIG. 5.

Speech signal coupled to a microphone 1 is sent forth to a telephone line via amplifier 2, variolossers 3 and 4 and hybrid transformer 5. At this time, the variolossers 3 and 4 are rendered into the low loss mode (with loss of 0 decibels) while variolossers 6 and 7 are rendered into the high loss mode (that is, the system is rendered into the transmit mode). On the other hand, a speech signal appearing from the telephone line is coupled through hybrid transformer 5, AGC amplifier 24, (the gain of which is controlled by the output of circuit 29 for rectifying and smoothing the receive signal level) variolossers 6 and 7 and amplifier 8 to a loudspeaker 9 and is radiated therefrom as speech. In this case, the variolossers 3 and 4 are rendered into the high loss mode while the variolossers 6 and 7 are rendered into the low loss mode (that is, the system is rendered into the receive mode).

The outputs of the amplifiers 2, variolossers 7 and 4 and hybrid transformer 5 are also coupled through respective logarithmic a-c compression circuits 10, 12, 16 and 17 and envelope detection circuits 11, 13, 18 and 19, the outputs of which are supplied as inputs to associated subtraction circuits 14 and 20. The output of the subtraction circuit 14 is compared in a comparator circuit 15 with a threshole value supplied at a terminal 26. If the former surpasses the latter, the output of the comparator circuit 15 renders the variolosser 3 into the low loss mode and a variolosser 7 into the high loss mode. The threshold value 26 is made as small as possible within a range free from mis-switching i.e., receive blocking of receive mode over to transmit mode due to acoustic coupling from the loudspeaker 9 at the microphone 1. When the comparator circuit 15 switches the variolosser 3 from the high loss mode to the low loss mode, it also triggers a mono-stable multi-vibrator 28. The triggered mono-stable multi-vibrator 28 produces a pulse with a duration of 20 to 200 msec., which constitutes an input to an OR circuit 22 for compulsively holding the variolosser 4 in the low mode and the variolosser 6 in the high loss mode for its period. The output of the other subtraction circuit 21 is similarly compared in a comparator circuit 21 with a threshold value 27, and if the former surpasses the latter the output of the comparator circuit 21, constituting another input to the OR circuit 22, renders the variolosser 4 into the low loss mode and the variolosser 6 into the high loss mode. The threshold value 27 is made as large as possible within a range free from mis-switching, i.e., transmit blocking of the transmit mode over to the receive mode due to side tone. The mono-stable multi-vibrator 28 and OR circuit 22 are required for ensuring smooth switching from the receive mode over to the transmit mode. If they are absent, the variolosser 4 will remain in the high loss mode although the variolosser 3 is rendered into the low loss mode when the threshold value 26 is surpassed by the output of the subtraction circuit 14 with appearance of speech at the microphone 1. In such case, the level of input to the logarithmic a-c compression circuit 16 is low so that the probability that the threshold value 27 is surpassed by the output of the subtraction circuit 20 is low. This is particularly pronounced where the transmission loss in the telephone line is small.

Figure 5:
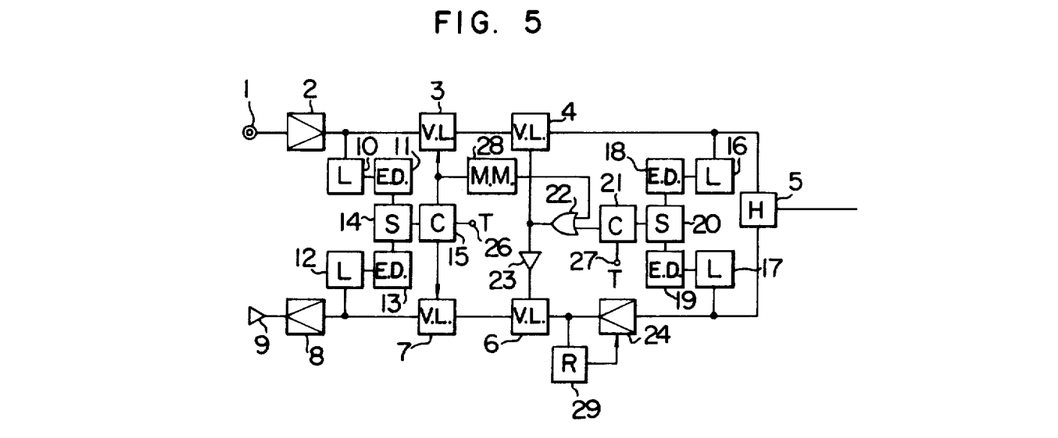
FIGS. 5, 6 and 7 are block diagrams showing other embodiments of the invention.

The features of the system of FIG. 5 are that the acoustic coupling and side tone are always monitored independently of each other, thus eliminating mis-switching and ensuring smooth "break in". On the demerit side, however, the number of component parts of the circuit is increased.

Figure 6:
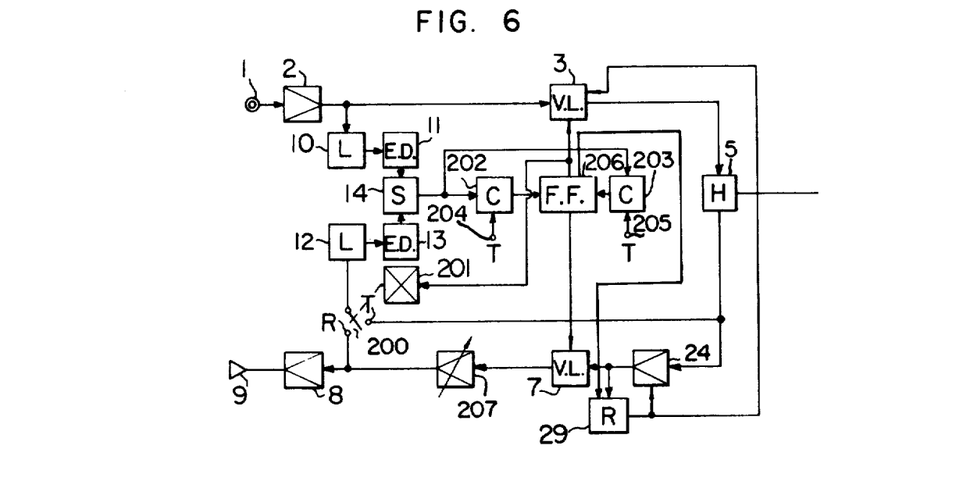

The circuit shown in FIG. 6 overcomes this drawback. In this embodiment, in the transmit mode only the side tone is monitored for preventing the transmit blocking due to side tone and also ensuring ready and quick "break in" by a speech signal from the telephone line, while in the receive mode only the acoustic coupling is monitored for preventing the receive blocking due to acoustic coupling and also ensuring ready and quick "break in" by original speech coupled to the microphone.

Referring now to FIG. 6, a microphone 1's input is sent forth to a telephone line via amplifier 2, variolossers 3 and hybrid transformer 5. On the other hand, an incoming signal from the telephone line is coupled through AGC amplifier 24, variolosser 7, manually gain-controllable amplifier 207 and amplifier 8 to a loudspeaker 9 and is radiated therefrom as speech.

Here, the variolossers 3 and 7 are reciprocally controlled such that they are in respectively low loss and high loss modes in the transmit mode and respectively high loss and low loss modes in the reception mode.

The output of the amplifier 2 is also coupled through logarithmic a-c compression circuit 10 and an envelope detection circuit 11 to provide one input to a subtraction circuit 14. A switch 200 is switched such as to couple the output from the hybrid transformer 5 in case of the transmit mode and the output of the variolosser 7 in case of the receive mode through a logarithmic a-c compression circuit 12 and an envelope detection circuit 13 to provide the other input to the subtraction circuit 14. The output of the comparator circuit 202 is switched from high level to low level when the output of the subtraction circuit 14 becomes lower than a threshold value supplied at a terminal 204, that is, when the output of the amplifier 2 becomes greater than the output of the variolosser 7 by $\alpha$ decibels or more. The value $\alpha$ (decibels) is the maximum level of acoustic coupling from loudspeaker 9 microphone 1, that is, the threshold value 204 is set such that the output of the comparator circuit 202 is switched when the difference between the outputs of the amplifier 2 and variolosser 7 becomes equal to $\alpha$ decibels.

The output of the comparator circuit 203 is switched from high level to low level when the output of the subtraction circuit 14 becomes lower than the threshold value at the terminal 205, that is, when the difference between the outputs of the amplifier 2 and hybrid transformer 5 becomes less than $\gamma$ decibels, which represents the worst value of side tone. This means that the threshold value 205 is set such that the output of the comparator circuit 203 is switched when the difference between the outputs of the amplifier 2 and hybrid transformer 5 becomes equal to $\gamma$ decibels.

The outputs of the comparator circuits 202 and 203 constitute inputs to a flip-flop circuit 206. When the flip-flop circuit 206 is in its stable state with a low level output, it is switched to its other stable state with a high level output when and only when the comparator circuit 202 is switched from its high level output producing state to its low level output producing state. When it is in the high level state, it is switched to the low level state when and only when the comparator circuit 203 is switched from the high level to the low level. It controls the variolossers 3 and 7 and switch 200 such that the transmit mode molds when the flip-flop circuit is at a high level and its low level corresponds to the receive mode. A control circuit 201 controls the switch 200 according to the output of the flip-flop circuit 17. The switch contact T is connected when the variolosser 3 is rendered into the low loss mode i.e., when the transmit mode is brought about, and the contact R is connected when the variolosser 7 is rendered into the low loss mode, i.e., when the receive mode is brought about.

It will be appreciated that in the case of the receive mode the switching therefrom to the transmit mode is made possible through the comparison of the outputs of the amplifier 2 and variolosser 7 (that is, by monitoring only the acoustic coupling). Also, in the case of the transmit mode the switching therfrom to the receive mode is made possible through the comparison of the output of the variolosser 3 (which is equal to the output of the amplifier 2 since the loss in the variolosser 3 is 0 decibels) and the output of the hybrid transformer 5 (that is, by monitoring only the side tone). Thus, the same function and purpose can be achieved with a simplified circuit construction, permitting the reduction of the number of component parts and contributing to cost reduction, which is thus very useful in practice.

Figure 13:
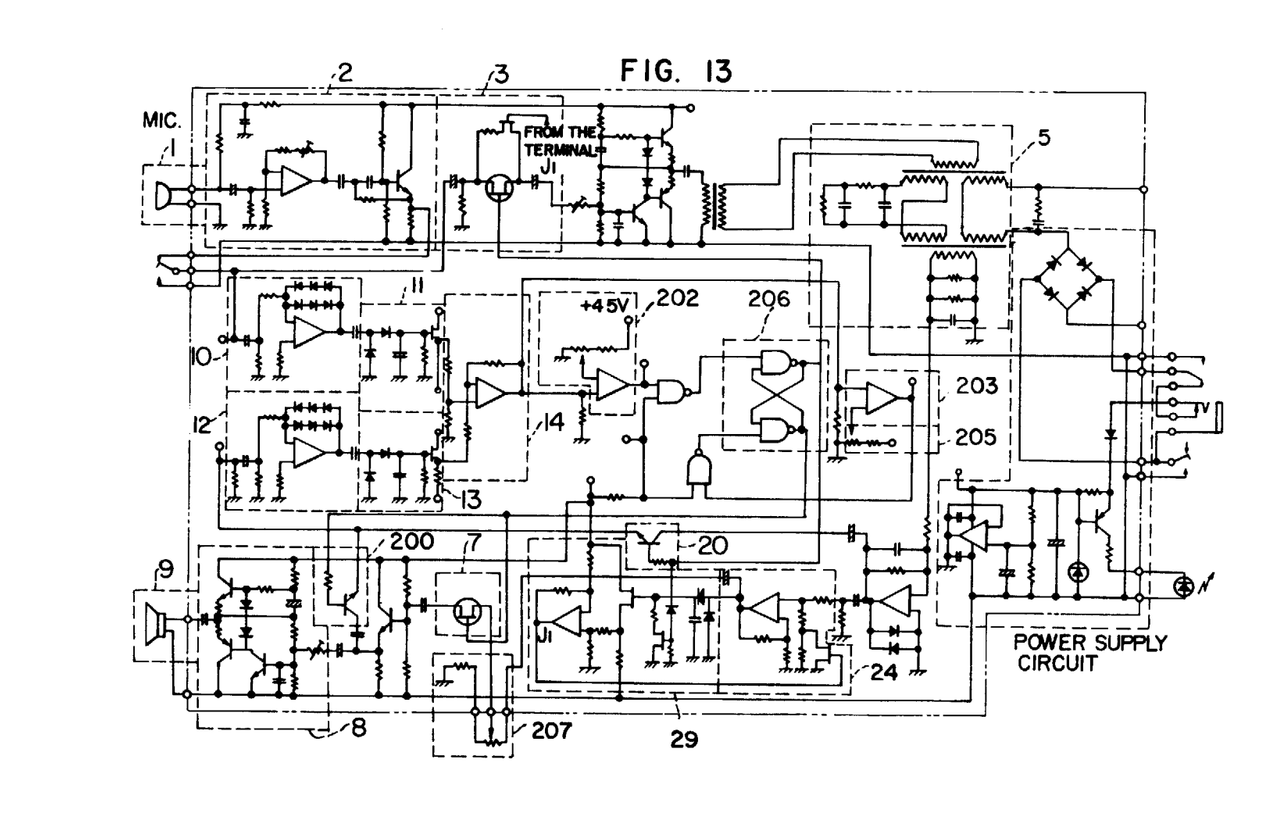
FIG. 13 is a circuit diagram showing a specific circuit construction of the intercommunication system of FIG. 6.

FIG. 13 shows a specific example of the circuit construction of the system of FIG. 6. Individual parts in this example are designated by like reference numerals and are not described in further detail.

The system of FIG. 6 requires an AGC amplifier in order to compensate for the transmission loss (of 0 to 30 decibels) in the telephone line and also prevent a sudden change of sound pressure with a change of the transmission loss in the telephone line when the other communication end is charged. However, it is difficult from the standpoint of circuit construction to employ the sole AGC amplifier with a maximum gain of 30 to 40 decibels as the receive amplifier. Also, since the gain of the AGC amplifier varies depending upon whether a speech signal is present or not, great variations of the noise level, which are uncomfortable to the ear, are prone. Therefore, in this embodiment, the amplifier 207 is provided to lessen the load of the AGC amplifier 24 and to enable a manual partial adjustment of the gain.

Figure 7:
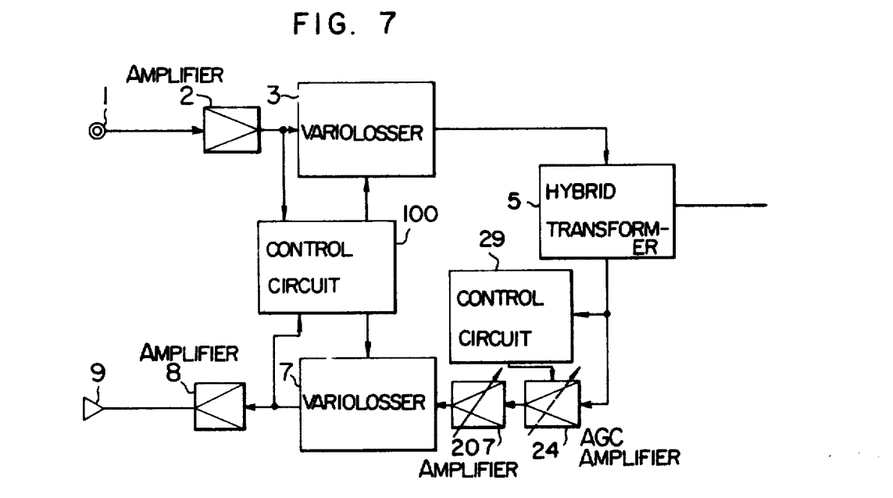

FIG. 7 shows still another embodiment of the invention identical in principle to the embodiment of FIG. 6, wherein a control circuit 100 is provided to control variolossers 3 and 7, amplifier 207 is provided on the output side of the AGC amplifier 24, and the input of the control circuit 29 is supplied from the hybrid transformer 5.

Figure 8:
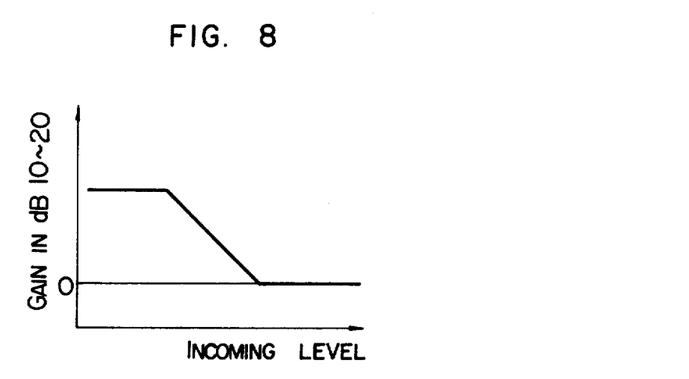
FIG. 8 shows a characteristic of an AGC amplifier used in the embodiments.

When the maximum gain of the AGC amplifier 24 is set to 10 to 20 decibels, its gain is controlled by the control signal output of the control circuit 29 according to the level of the incoming signal. FIG. 8 shows the gain characteristic of the AGC amplifier. The maximum gain of the amplifier 207, on the other hand, is again set to 10 to 20 decibels. The afore-mentioned problems can be solved by the combination of the AGC amplifier 24 and amplifier 207.

More particularly, when the transmission loss in the telephone line is changed with alteration of the opposite communication end, the resulting sudden change of sound pressure can be alleviated by the AGC amplifier 24 or the combination of AGC amplifier 24 and amplifier 207, while the deterioration of speech quality due to the presence of the AGC amplifier 24, that is, an unnaturally great amplification of ambient noise in the absence of speech, can be reduced since the maximum gain of the AGC amplifier itself is limited.

Now, the time constant of the rectifying circuit 29 for detecting the incoming level will be discussed. While the role of the AGC amplifier is to reduce gain when the incoming level is high with small transmission loss, unless this is done quickly a click noise is prone to occur at the time of the rise of a speech signal. In order to eliminate this, the rising time constant (attack time) of the rectifying circuit must be quite short; specifically, it is set to be 0.1 msec. or less. In addition, if the fall time constant (release time) is short a slight pause in the speech signal would increase the gain accompanied by an increase of the ambient noise, which is very uncomfortable to the ear. To prevent this, the release time has to be very long, specifically 3 sec. or more. A long release time, however, presents an inconvenience such that when the transmission loss is large, that is, when the maximum gain of the AGC amplifier has to be maintained, a high-level transmit signal is likely to be introduced into the recieve region as a side tone, thus rendering the AGC amplifier gain small. In such case, only a low sound would be issued from the loudspeaker for several seconds after switching to the receive mode. To preclude this, a circuit construction where the release time is shortened at the time of the transmit mode is needed. For example, in FIG. 13 showing the detailed circuit diagram of FIG. 6, the time constant of the discharging path of the capacitor which comprises a resistor and an FET element changes depending upon the on (transmit mode) or off (receive mode) condition of the FET element as compared to the charging path (through a diode) of the capacitor arranged in the block 29.

In the mean time, since in the above system the ambient noise is on-off switched together with the speech signal, departure from the natural acoustical situation which is peculiar to the voice switching system is very likely to remain.

Although this unnatural feeling is not a substantial problem to one who is accustomed to loudspeaker telephony, it is an unusual experience for one who is familiar with only the ordinary telephone system because when he is using a telephone set for communication ambient noise is shut off from his ear.

To remove or reduce this unnatural feeling the loss amount in the variolosser 3 is controlled by using the output of the rectifying circuit 29, i.e., the control signal from the AGC amplifier, as shown in FIG. 6. More particularly, when reducing the gain of the AGC amplifier the loss amount in the variolosser is simultaneously reduced to such an extent that "singing" will not take place so that even in the receive mode there is some transmit signal effective for alleviating the afore-mentioned unnatural feeling.

As an alternative measure it may be considered to send forth in the receive mode a noise simulating ambient noise to the opposite communication end.

Figure 9:
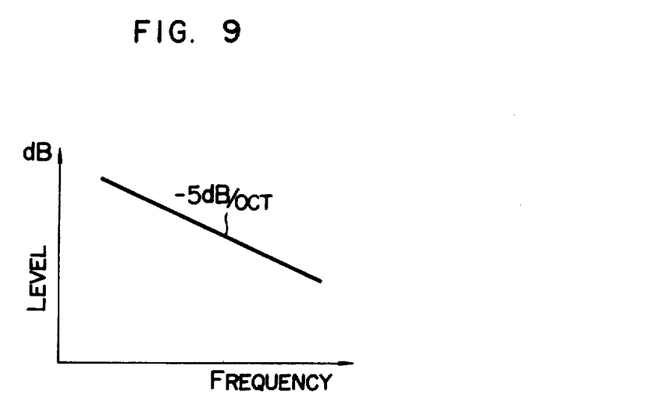
FIG. 9 shows an ambient noise spectrum utilized in the intercommunication system according to the invention.

The statistical ambient noise spectrum has a slope of −5 decibels/oct as shown in FIG. 9, which is called "Hoth noise" and it will be ideal if noise having a character approximating this spectrum is sent forth.

Figure 10:
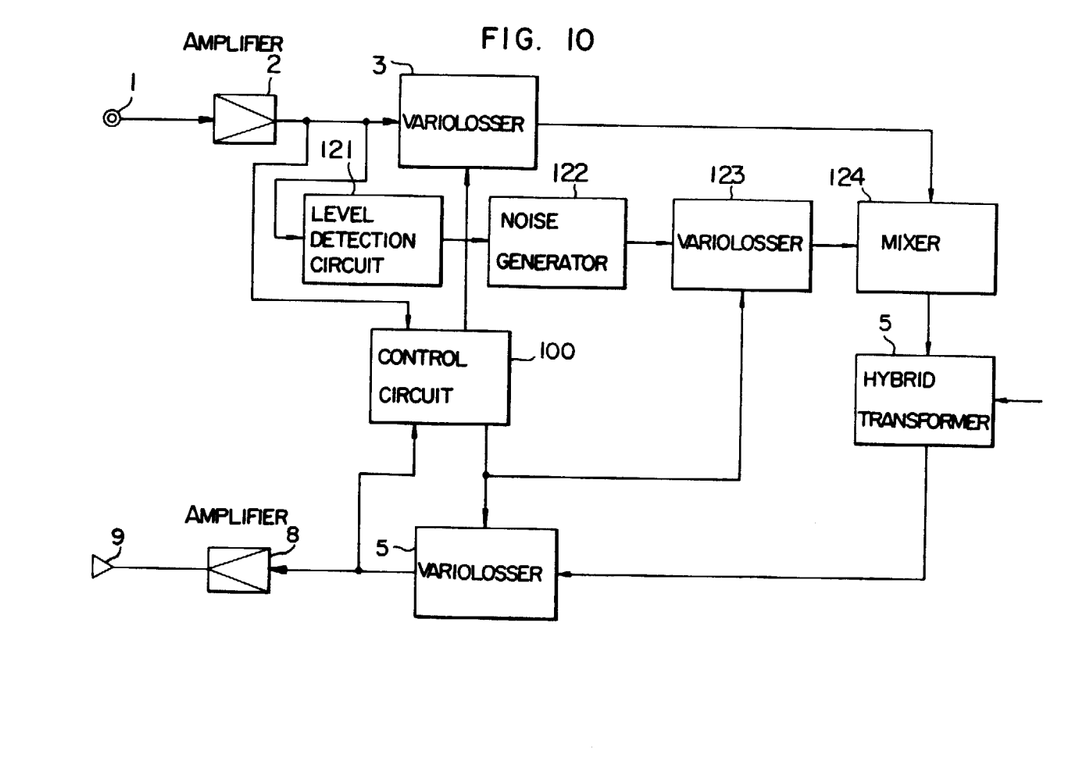
FIG. 10 is a block diagram showing a further embodiment utilizing the same ambient noise characteristic.

This may be realized by a system shown in FIG. 10. Referring now to the Figure, designated at 1 is a microphone, at 2 is an amplifier, at 3 and 7 variolossers, at 5 a hybrid transformer, at 8 an amplifier, at 9 a loudspeaker, and at 100 a control circuit for reciplocally controlling the variolossers 3 and 7 according to the output levels of the amplifier 2 and amplifier 207.

In the operation of this construction, a speech signal coupled to the microphone 1 is sent forth to the transmission line via amplifier 2, variolosser 3 and hybrid transformer 5. On the other hand, an incoming signal from the transmission line is coupled through variolosser 7 and amplifier 8 to the loudspeaker 9 and is radiated therefrom as speech.

The output of the amplifier 2 (or sometimes the input to the amplifier 8) is also coupled to a level detection circuit 121 to detect the level of ambient noise. The output of the le;vel detection circuit 121 is used to control the output level of a noise generator 122, whereby in the receive mode the output of the noise generator is sent forth to the transmission line via variolosser 123, mixer 124 and hybrid transformer 5.

With this arrangement a constant noise can be heard at the opposite communication end irrespective of the mode thereof, either the transmit or receive mode, and thus unnatural variation of ambient noise level due to speech switching can be overcome.

Figure 11:
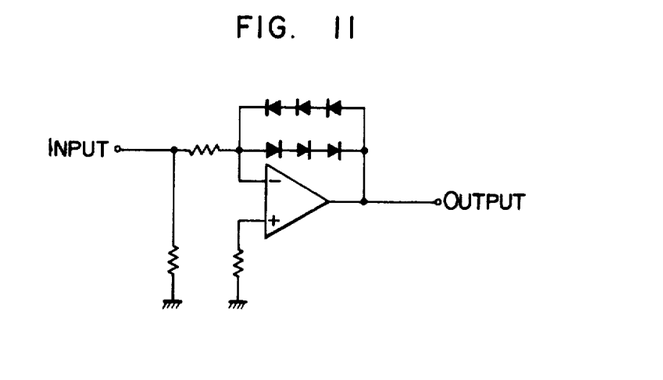
FIG. 11 is a circuit diagram showing an example of the logarithmic a-c compression circuit.
Figure 12:
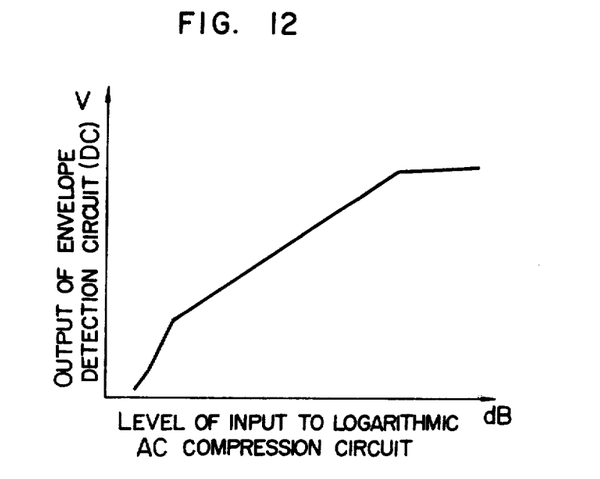
FIG. 12 shows a characteristic of the logarithmic a-c compression circuit employed in the system according to the invention.

FIG. 11 shows a circuit construction of the logarithmic a-c compression circuit employed in the system according to the invention. As for satisfactory performance of the logarithmic a-c compression circuit, it is required that the plus polarity and minus polarity waveforms be practically equal, that the bandwidth and dynamic range be broad (300 to 4,000 Hz and 50 decibels or above respectively), that there be no substantial temperarture dependency of the slope of the input-output characteristic (as shown in FIG. 12) and that the component parts be low in cost. The circuit of FIG. 11 meets these requirements. This circuit features a series connection of a plurality of very ordinary rectifying diodes inserted in the feedback loop. Even if the voltage-current characteristic of the individual diodes fluctuates, the voltage-current characteristic of their series set will never fluctuate as ascertained from the "low of large numbers". Thus, it is possible to have substantially equal plus polarity and minus polarity waveforms and obtain broad dynamic range. Also, since very ordinary diodes can be randomly assembled, considerable cost reduction can be expected. Further, the obtainable bandwidth can well cover that of the ordinary operational amplifier (741 etc.). Furthermore, it is confirmed that the temperature dependency of the characteristic slope presents no substantial problems.

While some preferred embodiments of the invention have been described, the features of the invention to be protected are as set forth in the claims.

What is claimed is:

1. An intercommunication system comprising
 a transmit channel and a receive channel, said transmit channel including a microphone operative in the transmit mode and a first variolosser circuit, and said receive channel including a loudspeaker operative in the receive mode, a manually gain-adjustable circuit, a second variolosser circuit and an automatic gain control amplifier, said first and second variolosser circuits each providing a variable amount of loss and permitting the high frequency region of the voice frequency band to pass therethrough including a mode wherein the amount of loss is relatively large,
 a hybrid transformer connecting said transmit and receive channels,
 first means for deriving a firt control signal from said transmit channel,
 second means including a switch for selectively deriving a second control signal from said receive channel, said second control signal being derived in the transmit mode from a point in said system adjacent said hybrid transformer and in the receive mode from a point in said system adjacent said loudspeaker,
 subtraction means for subtracting said first control signal from said second control signal,
 first and second comparators having first and second different threshold values coupled to the output of said subtraction means, said first threshold value corresponding to the second control signal derived adjacent said loudspeaker and said second threshold value corresponding to the second control signal derived adjacent said hybrid transformer, and
 a flip-flop having first and second inputs coupled to the outputs of said first and second comparators, respectively, and first and second outputs coupled to said first and second variolosser respectively, said flip-flop selecting the variable amount of loss in said first and second variolosser in accordance with the outputs of said comparators.

2. A system according to claim 1, further comprising a rectifying and smoothing circuit for controlling the gain of said AGC amplifier, said rectifying and smoothing circuit including a timing means having a short discharging time constant in the transmit mode and having a long discharging time constant in the receive mode.

3. A system according to claim 2 which further comprises means coupling said first variolosser circuit to said rectifying and smoothing circuit, the amount of loss in said first variolosser circuit being thereby controlled in accordance with the gain control of said receive channel.

4. A system according to claim 1, further comprising means for detecting a noise signal transmitted from said microphone in the receive mode to provide an analogous noise signal, and means for mixing said analogous noise signal into said transmit channel.

* * * * *